(12) United States Patent
Kram et al.

(10) Patent No.: US 10,101,241 B2
(45) Date of Patent: Oct. 16, 2018

(54) KIT FOR BEARING AND BEARING ARRANGEMENT

(71) Applicant: Schaeffler Technologies AG & Co. KG, Herzogenaurach (DE)

(72) Inventors: Martin Kram, Gerolzhofen (DE); Jens Heim, Bergrheinfeld (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/540,444

(22) PCT Filed: Feb. 3, 2016

(86) PCT No.: PCT/DE2016/200064
§ 371 (c)(1),
(2) Date: Jun. 28, 2017

(87) PCT Pub. No.: WO2016/124191
PCT Pub. Date: Aug. 11, 2016

(65) Prior Publication Data
US 2017/0370802 A1     Dec. 28, 2017

(30) Foreign Application Priority Data
Feb. 6, 2015 (DE) .................. 10 2015 202 130

(51) Int. Cl.
*F16C 19/06* (2006.01)
*F16C 19/52* (2006.01)
(Continued)

(52) U.S. Cl.
CPC ............ *G01M 13/04* (2013.01); *B21B 38/00* (2013.01); *F16C 19/06* (2013.01); *F16C 19/522* (2013.01);
(Continued)

(58) Field of Classification Search
CPC .... F16C 19/06; F16C 19/522; F16C 33/6648; F16C 33/6681; G01M 13/04; G01L 5/009; G01L 5/0019; B21B 38/00
(Continued)

(56) References Cited

U.S. PATENT DOCUMENTS 4,203,319 A * 5/1980 Lechler .................. B23Q 17/09
73/862.49
4,406,169 A * 9/1983 Ikeuchi ................. G01M 13/04
340/682
(Continued)

FOREIGN PATENT DOCUMENTS

DE         10136438      3/2002
DE         10054069      5/2002
(Continued)

*Primary Examiner* — Marcus Charles
(74) *Attorney, Agent, or Firm* — Volpe and Koenig, P.C.

(57) ABSTRACT

A kit including a plurality of modules which can be integrated in a bearing installation space is disclosed. The modules include a plurality of supply management modules for supplying bearing components, a plurality of functional modules for measuring bearing state variables and/or for triggering and/or activating specified events under specified conditions, and a plurality of infrastructure modules for implementing communication tasks and/or for saving and processing specified and/or recorded data. A bearing arrangement having a bearing and a plurality of modules which can be connected to a common connection medium is also disclosed, wherein the modules are components of the kit.

9 Claims, 1 Drawing Sheet

(51) Int. Cl.
*G01M 13/04* (2006.01)
*G01L 5/00* (2006.01)
*B21B 38/00* (2006.01)
*F16C 33/66* (2006.01)

(52) U.S. Cl.
CPC ........ *G01L 5/0009* (2013.01); *F16C 33/6648* (2013.01); *F16C 33/6681* (2013.01)

(58) Field of Classification Search
USPC .......... 384/448, 445; 73/579, 593, 587, 649, 73/650, 660; 702/57, 183; 340/682, 517
See application file for complete search history.

(56) References Cited

U.S. PATENT DOCUMENTS

| | | | | |
|---|---|---|---|---|
| 4,460,893 A * | 7/1984 | Thomas | ................ | F16C 17/243 340/589 |
| 5,602,761 A | 2/1997 | Spoerre et al. | | |
| 5,952,587 A * | 9/1999 | Rhodes | ................ | F16C 19/364 73/862.541 |
| 6,161,962 A * | 12/2000 | French | ................ | B61F 15/20 384/448 |
| 6,321,602 B1 * | 11/2001 | Ben-Romdhane | ...... | F16C 19/52 340/679 |
| 6,508,128 B2 * | 1/2003 | Bode | ................ | B21B 31/07 73/579 |
| 6,553,837 B1 * | 4/2003 | Lysen | ................ | G01H 1/003 73/579 |
| 6,711,952 B2 * | 3/2004 | Leamy | ................ | F01D 21/00 73/579 |
| 7,034,711 B2 * | 4/2006 | Sakatani | ................ | G01H 1/003 340/682 |
| 7,182,519 B2 * | 2/2007 | Singh | ................ | F01D 17/02 384/448 |
| 7,184,930 B2 * | 2/2007 | Miyasaka | ................ | B61F 15/20 246/169 A |
| 7,555,953 B2 * | 7/2009 | Yoshioka | ................ | F16C 29/00 73/587 |
| 7,609,137 B2 | 10/2009 | Roesner et al. | | |
| 7,652,587 B2 * | 1/2010 | Hohn | ................ | F16C 19/525 340/514 |
| 8,438,925 B2 * | 5/2013 | Klos | ................ | G01M 13/045 73/587 |
| 2008/0065354 A1 * | 3/2008 | Yoshioka | ................ | F16C 29/00 702/183 |
| 2008/0216576 A1 | 9/2008 | Eckert et al. | | |
| 2010/0213777 A1 * | 8/2010 | de la Haye | ................ | B04B 9/04 310/90.5 |
| 2013/0260715 A1 * | 10/2013 | Li | ................ | H04L 12/1407 455/406 |
| 2014/0169715 A1 * | 6/2014 | Hebrard | ................ | F16C 41/00 384/448 |

FOREIGN PATENT DOCUMENTS

| | | | | |
|---|---|---|---|---|
| DE | 10064420 | 7/2002 | | |
| DE | 10236790 | 10/2003 | | |
| DE | 102013215693 A1 * | 7/2009 | ............. | F16C 41/00 |
| DE | 102009021469 | 11/2010 | | |
| DE | 102009037424 | 2/2011 | | |
| DE | 102012202522 | 8/2013 | | |
| DE | 102012209060 | 12/2013 | | |
| EP | 2696071 | 2/2014 | | |
| GB | 2456821 | 7/2009 | | |
| WO | 2007006691 | 1/2007 | | |

\* cited by examiner

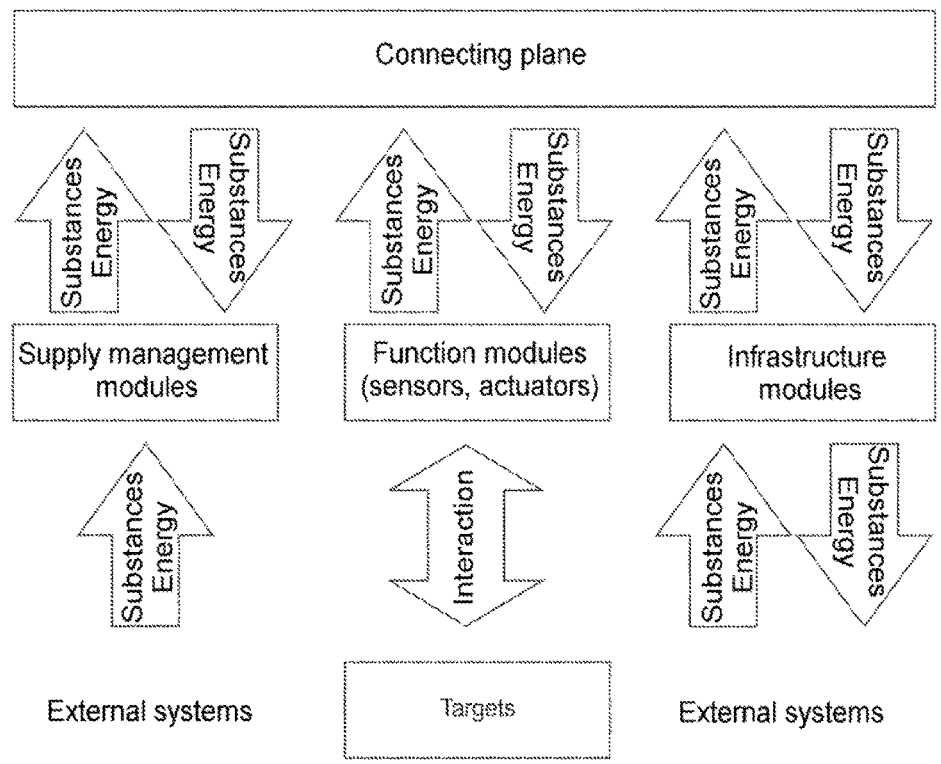

KIT FOR BEARING AND BEARING ARRANGEMENT

CROSS REFERENCE TO RELATED APPLICATIONS

This application claims priority to German Application 10 2015 202 130.0, filed Feb. 6, 2015; and PCT/DE 2016/200064, filed Feb. 3, 2016.

BACKGROUND

The present invention relates to a kit for bearings and to a bearing arrangement. One field of application of the invention are sensor bearings which are used, for example, for being able to measure physical quantities in machines such as rotational speed or temperature directly at a roller bearing.

DE 101 36 438 A1 deals with a sensor arrangement in a roller bearing in which a number of sensor elements are integrated in bearing rings of the roller bearing. The sensor elements can be connected via a digital bus.

From DE 10 2009 037 424 A1, a bearing arrangement having a lubricant sensor is known which sends information about the state of the lubricant to a central receiving station.

DE 10 2009 021 469 A1 shows a sensor bearing unit comprising a roller bearing constructed as ball-type roller bearing with a sensor housing, arranged on a bearing ring, with an integrated sensor device for detecting bearing operating states. The sensor housing is designed as an adapter ring resting against a free circumferential area or against a front area of the bearing ring, respectively. The adapter ring is dimensioned in such a manner that the radial or axial dimensions of the sensor bearing unit are at the most equal to those of a ball bearing having the same supporting performance.

DE 10 2012 202 522 A1 describes a sensor bearing having a roller bearing. The roller bearing comprises an inner ring, an outer ring and roller bodies arranged between inner ring and outer ring which are arranged in pockets of a cage. The sensor bearing also contains at least one measurement pickup for measuring the forces acting on the roller bodies and a communication device which allows an exchange of data between the measurement pickup and a signal receiver. In the cage, no roller bear bodies are arranged in one to four pockets. In the pockets free of roller bodies, the measurement pickup or pickups are connected rigidly to the cage.

The sensor bearings currently known are mostly designed for a narrow range of objectives. As a rule, a particular functionality is to be accommodated in a particular installation space. For this reason, sensor bearings are being developed which are in each case optimized for individual or few aspects. Thus, for example, sensor bearings are known which are extremely slender while other sensor bearings have a particular protection against electromagnetic influences. As a rule, the known solutions follow the development approach of a singular objective.

SUMMARY

By comparison, the object of the present invention lies in equipping different bearings with little expenditure with functionalities required for the respective application. Furthermore, a bearing arrangement is also to be provided which can be adapted to different applications with little expenditure.

As a solution to the object according to the invention, a kit according to one or more of the features listed below is used. The kit according to the invention is used for providing components for a bearing. For this purpose, the kit contains a plurality of modules. The modules can be combined with one another in an extremely variable way. The modules comprise a plurality of supply management modules for supplying bearing components, a plurality of functional modules for measuring bearing state variables and/or for triggering or activating predetermined events under predetermined conditions and a plurality of infrastructure modules for implementing communication tasks and/or for storage and processing of predetermined and/or detected data. The supply management modules, the functional modules and the infrastructure modules preferably have in each case compatible mechanical interfaces, compatible electrical interfaces, compatible functional interfaces and/or compatible material interfaces. In this context, they are preferably the same mechanical interfaces, the same electrical interfaces, the same functional interfaces and the same material interfaces, respectively. The supply management modules are preferably mutually exchangeable within the bearing installation space. The functional modules are preferably mutually exchangeable within the bearing installation space. The infrastructure modules are preferably mutually exchangeable within the bearing installation space.

By the invention, a topology is specified for the first time for bearings equipped with particular functionalities. The topology of such a bearing is understood to be the arrangement of modules or components within the installation space or within the environment of the bearing, respectively. Due to the lack of a uniform topology for bearings equipped with particular functionalities, all developments related to such bearings have been implemented as in each case inherent development projects in the prior art. As a result, modules could not be transferred from one project into another either in the hardware or in the software. Possible effects of synergy between individual project have thus not been utilized until now.

An essential advantage of the kit according to the invention can thus be seen in the fact that by preserving various modules which in each case handle a specific task, a low-expenditure configuration of bearings equipped with the most varied functionalities is possible. For this purpose, it is only necessary to combine the modules needed in the respective case of application with one another and enter them into the respective bearing installation space or position them at the appropriate position in the environment of the bearing. Mechanical interfaces, electrical interfaces, functional interfaces and material interfaces are preferably specified, according to the invention, in such a manner that an optimum coupling of the modules faces an optimum compatibility. The modules can be used both in different constructional rows of bearings and in different constructional bearing sizes. Furthermore, it is advantageous that the modules can be developed individually. In this way, the complexity of the individual development tasks is considerably reduced.

According to an advantageous embodiment, the group of supply management modules comprises at least one module for supplying sensor bearing components with electrical energy. Preferably, the kit contains various supply management modules for supplying sensor bearing components with electrical energy. These are preferably a voltage supply module, an accumulator module, a battery module, a capacitor module, an energy management module, an energy harvesting module, a generator module, a signal and energy conduction module and/or an energy interface module for eternal devices.

The group of supply management modules preferably comprises at least one supply management module for supplying sensor bearing components with lubricant. This includes preferably a fat depot or oil depot module and an additive module from which the bearing can be supplied with lubricant when needed.

According to an advantageous embodiment, the kit comprises functional modules for measuring bearing state variables such as rotational speed, temperature, force, angle of rotation, acceleration and lubricant quality. Furthermore, the kit can also comprise functional modules for driving lubricant pumps (pump module) or display units (signaling module, for example loudspeaker). The group of the functional modules also includes a service module which triggers corresponding activities under specified conditions.

It has been found to be suitable to equip the kit with at least one infrastructure module for electrically linking the modules to a connection medium. This is preferably an interface module which adapts the electrical interface to the respective environment, for example 4 mA to 20 mA or ethernet. The infrastructure modules preferably contained in the kit also include a radio module, an RFID (radio frequency identification) module, an NFC (near-field communication) module, a storage module, a cable module, an identification module and an operating hours module. In the storage module, the measurement data detected by the functional modules, for example, can be stored. In addition, the storage module can also be used for storing reference data.

The modules are preferably provided for a roller bearing so that they can be integrated at least partially into a roller bearing installation space. In principle, the modules can be provided for linear bearings or for rotatable bearings.

To achieve the object according to the invention, a bearing arrangement is also used.

The bearing arrangement according to the invention includes a bearing and a plurality of modules connectable to a common connection medium. The modules are components of the kit according to the invention, already described. The modules are preferably components of one of the preferred embodiments of the kit according to the invention.

According to one advantageous embodiment, the connecting medium is a bus system. The connecting medium can also be a wire-connected bus system.

The modules of the bearing arrangement can be coupled to systems located outside the bearing, if necessary. For example, individual modules can be coupled to external energy supply systems or external facilities for data processing and data evaluation.

BRIEF DESCRIPTION OF THE DRAWINGS

A preferred embodiment of the invention will be explained in greater detail by the attached single FIGURE in the text which follows.

DETAILED DESCRIPTION OF THE PREFERRED EMBODIMENTS

The FIGURE shows a diagrammatical representation of the topology of a preferred embodiment of a bearing arrangement according to the invention. This embodiment of the bearing arrangement according to the invention comprises a bearing (not shown) and a number of modules integrated into the installation space of the bearing or arranged in the environment of the bearing.

From the representation it can be seen that the modules can be combined in three groups. Thus, there is, on the one hand, the group of the supply management modules. This group includes modules for supplying bearing components with electrical energy such as, for example, a voltage supply module, an accumulator module, a battery module, a capacitor module, an energy management module, an energy harvesting module, a generator module, a signal and energy conduction module and an energy interface module for external devices. It must be pointed out that not all modules mentioned are used in the bearing but only the modules required for the respective case of application.

A further group of modules are functional modules which are used for measuring bearing state variables and/or triggering and/or activating predetermined events under predetermined conditions. This includes, for example, a rotational speed module, a temperature module, a force module, an angle-of-rotation module, an acceleration module, a lubricant quality module, a pump module, a service module and a signaling module. Here, too, it is not all modules mentioned, which are present but, naturally, only those needed in each case.

The third group of modules comprises infrastructure modules which are used for implementing communication tasks and/or storage and processing of predetermined and/or detected data. Into this group, modules mentioned in the text which follows are arranged: a radio module, an RFID module, an NFC module, a storage module, an interface module, a cable module, an identification module and an operating-hours module. As in the case of the other groups of modules, here, too, not all possible infrastructure modules are used at the same time, as a rule.

The modules are connected to a common connecting plane. There is an exchange of substances, information and/or energy between the individual modules via the connecting plane. The supply management modules can be linked to external systems such as, for example, energy supply systems. In this context, there is an exchange of substances, information and energy from the external systems to the direction of supply management modules.

The functional modules are in contact with particular targets. Thus, the sensors determine their measurement data at predetermined measuring points. Actuators trigger particular activities under predetermined conditions at particular points.

The infrastructure modules are connected to external systems with which they can exchange substances, information and energy. The storage module, for example, can be connected to an external data processing unit.

The invention claimed is:

1. A kit for bearings comprising a plurality of modules, the kit comprising:
   a plurality of supply management modules for supplying bearing components,
   a plurality of functional modules for at least one of measuring bearing state variables or for at least one of triggering or activating predetermined events under predetermined conditions, and
   a plurality of infrastructure modules for at least one of implementing communication tasks or for storage and processing of at least one of predetermined or detected data,
   wherein (i) each module of the plurality of supply management modules, (ii) each module of the plurality of functional modules, and (iii) each module of the plurality of infrastructure modules have mutually compatible mechanical interfaces, electrical interfaces, functional interfaces or material interfaces within each subset (i)-(iii) of the plurality of modules.

2. The kit as claimed in claim 1, wherein at least one of the supply management modules is designed for supplying bearing components with electrical energy.

3. The kit as claimed in claim 1, wherein at least one of the supply management modules is designed for supplying bearing components with lubricant.

4. The kit as claimed in claim 1, wherein the functional modules are designed for measuring at least one of rotational speed, temperature, force, angle of rotation, acceleration or lubricant quality.

5. The kit as claimed in claim 1, wherein at least one of the functional modules is designed for driving at least one of lubricant pumps or display units.

6. The kit as claimed in claim 1, wherein at least one of the infrastructure modules is designed for wireless data exchange.

7. The kit as claimed in claim 1, wherein at least one of the infrastructure modules is designed for electrically linking the modules to a connecting medium.

8. A bearing arrangement comprising a bearing and a plurality of modules connectable to a common connecting medium, the modules being components of a kit as claimed in claim 1.

9. The bearing arrangement as claimed in claim 8, wherein the connecting medium is a bus system.

* * * * *